United States Patent
Kwon (10) Patent No.: US 7,063,295 B2
(45) Date of Patent: Jun. 20, 2006

(54) APPARATUS FOR ADJUSTING AN ANGLE OF A DISPLAY MEANS AND A CONNECTION BRACKET THEREOF

(75) Inventor: Gil Soon Kwon, Daegu-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/160,163

(22) Filed: Jun. 4, 2002

(65) Prior Publication Data

US 2002/0179791 A1 Dec. 5, 2002

(30) Foreign Application Priority Data

Jun. 5, 2001 (KR) ............................... 2001-31482

(51) Int. Cl.
*E04G 3/00* (2006.01)
(52) U.S. Cl. ................. 248/276.1; 248/919; 248/274.1
(58) Field of Classification Search ................ 248/918, 248/921, 922, 923, 371, 286.1; 403/326, 403/327, 329, 325, 321
See application file for complete search history.

(56) References Cited

U.S. PATENT DOCUMENTS

| | | | | | |
|---|---|---|---|---|---|
| 2,828,098 | A | * | 3/1958 | Lehman | 248/293 |
| 4,960,256 | A | * | 10/1990 | Chihara et al. | 248/284 |
| 5,854,735 | A | * | 12/1998 | Cheng | 361/681 |
| 5,967,479 | A | * | 10/1999 | Sweere et al. | 248/280.11 |
| 6,098,952 | A | * | 8/2000 | Tonn | 248/688 |
| 6,419,196 | B1 | * | 7/2002 | Sweere et al. | 248/276.1 |
| 6,554,238 | B1 | * | 4/2003 | Hibberd | 248/278.1 |
| 6,554,242 | B1 | * | 4/2003 | Kim | 248/371 |
| 6,554,527 | B1 | * | 4/2003 | O'Donnell et al. | 403/353 |
| 6,581,893 | B1 | * | 6/2003 | Lu | 248/291.1 |

* cited by examiner

*Primary Examiner*—Robert P. Olszewski
*Assistant Examiner*—Steven M. Marsh
(74) *Attorney, Agent, or Firm*—Fleshner & Kim, LLP (57) ABSTRACT

An apparatus for adjusting an angle of a display which easily controls the view angle of the display so as to comply with a user s wishes, and a connection bracket of the apparatus are provided. A series of guide brackets and connection brackets couple the display to a fixing bracket fixed to a wall or support. A flap-fixing bracket is attached to the fixing bracket, and a flap, comprising two crossed flap members coupling a balance shaft and an angle adjustable shaft allow a viewing angle to be adjusted through the spreading and the folding of the flap. The connection bracket includes a product bracket attached to a holding-down bracket. The product bracket attaches on one surface to the display, and at its ends to the holding doxvn bracket. The holding-down bracket is easily attached to and separated from the product bracket. Thus the angle of the display is easily adjusted, using limited force, so as to comply with a user's wishes.

21 Claims, 7 Drawing Sheets

FIG.1

(Related Art)

APPARATUS FOR ADJUSTING AN ANGLE OF A DISPLAY MEANS AND A CONNECTION BRACKET THEREOF

BACKGROUND OF THE INVENTION

1. Field of the Invention

The present invention relates to an apparatus for adjusting an angle of a display means, and more particularly to an apparatus for adjusting an angle of a display means, which easily controls the view angle of the display so as to comply with a user's wishes, and a connection bracket of the apparatus.

2. Description of the Related Art

Typically, thin-type display means such as Liquid Crystal Display (LCD) TVs or Plasma Display Panel (PDP) TVs are fixed to a wall, i.e., in a built-in mode, thereby maximizing space utilization. This built-in mode does not generate an unnecessary gap between the back surface of the display means and the wall, thereby improving installation efficiency.

However, with this built-in type display means, in case the user wants to adjust a view angle of the display means fixed to the wall, the display means must be entirely detached from the wall. Then, after adjusting the view angle of the display means, the display means must be again attached to the wall. Therefore, this procedure is very inconvenient to the user as well as causes damage to the wall.

Therefore, in order to solve the aforementioned problems, various apparatuses for supporting the thin-type display means so as to adjust the view angle of the display means have been developed.

Figure 1:
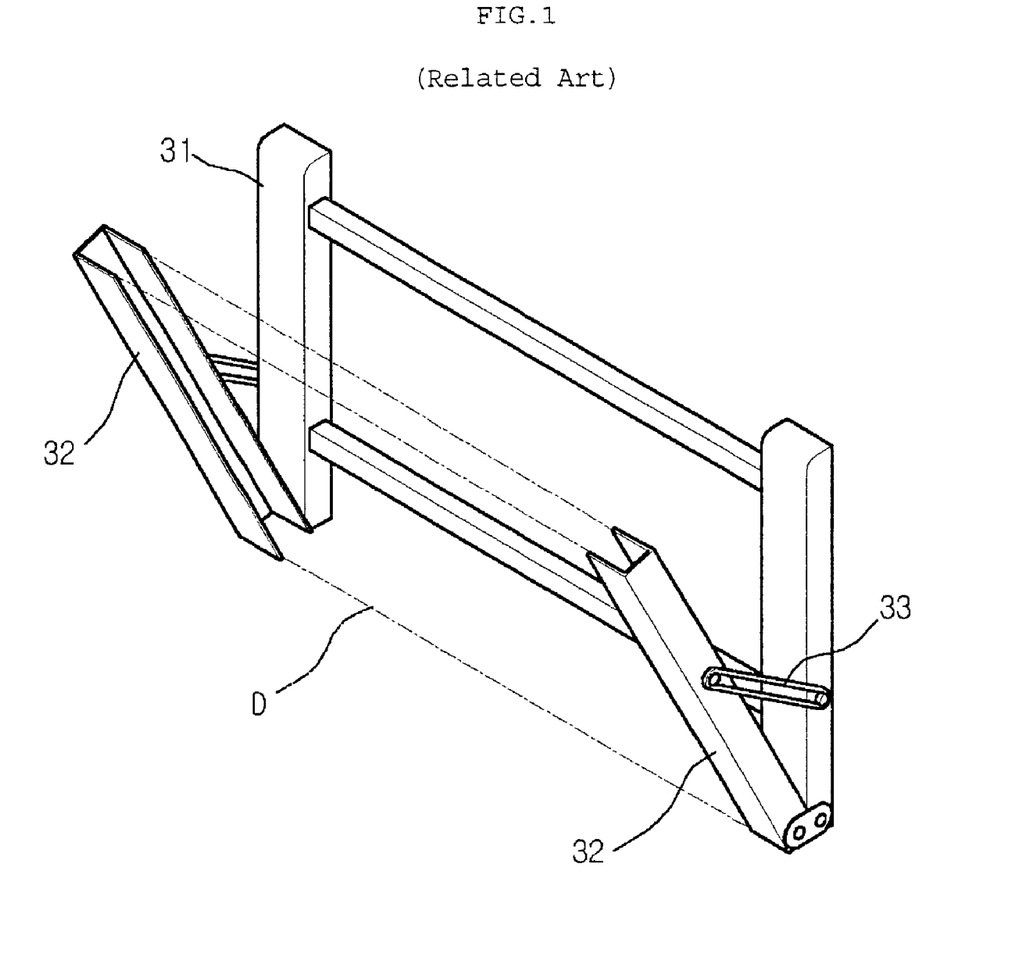
FIG. 1 is a perspective view of a conventional apparatus for adjusting an angle of a display means.

FIG. 1 is a perspective view of a conventional apparatus for adjusting an angle of a wall-mounted display means.

With reference to FIG. 1 the conventional apparatus for adjusting the angle of the wall-mounted display means comprises a fixture 31, a pair of supporters 32, and link members 33. The fixture 31 is attached to a wall. One end of each supporter 32 is pivotably connected to the fixture 31. The link members 33 serve to connect the supporters 32 to the fixture 31.

A thin-type display means D is interposed between two supporters 32, thereby being installed on the conventional apparatus for adjusting the angle of the display means. The supporters 32 provided with the display means D are spread or folded, thereby adjusting the view angle of the display means D.

Herein, an angle of spreading or folding the supporter 32 is restricted by the link member 33, which moves along the supporter 32.

According to the above-described link system supporting apparatus, the view angle of the display means D is adjusted by spreading and folding the supporters 32. Then, the adjusted angle of the display means D is fixed by the link members 33.

However, since the display means D is very heavy, women or old and feeble persons cannot easily adjust the view angle of the display means D using the above-described link system supporting apparatus.

Although the view angle of the display means D is adjusted, it is not easy to finely adjust the view angle of the display means D as to comply with the user's wishes.

SUMMARY OF THE INVENTION

Therefore, the present invention has been made in view of the above problems, and it is an object of the present invention to provide an apparatus for adjusting an angle of a display means, which easily controls the view angle of the display means by the manipulation of a side hand lever so as to comply with a user's wishes.

It is another object of the present invention to provide a connection bracket for easily attaching and detaching the angle adjusting apparatus to and from a display means.

In accordance with one aspect of the present invention, the above and other objects can be accomplished by the provision of an apparatus for adjusting an angle of a display means, comprising: a fixing bracket fixed to a wall or a supporter; two guide brackets, each being installed on both ends of the fixing bracket; connection brackets, one end of each connection bracket being pivotably connected to one end of the guide bracket and one surface of each connection bracket is connected to a designated surface of a display means; a flap-fixing bracket being attached to a designated area of the fixing bracket; a flap comprising two pieces crossing each other, one end of one piece of the flap being fixed to the flap-fixing bracket and one end of the other piece of the flap being pivotably connected to the flap-fixing bracket; a balance shaft for adjusting a angle of the connection bracket according to the spreading and folding of the flap, each of both ends of the balance shaft being connected to respective connection brackets, and the other end of one piece of the flap being fixed to the balance shaft and the other end of the other piece of the flap is connected to the balance shaft so as to move along the balance shaft; and an angle adjustable shaft being connected to one end of one piece of the flap and including means for adjusting the spreading and folding of the flap.

In accordance with another aspect of the present invention, there is provided a connection bracket comprising a product bracket including means for being fixed to one surface of the display means and means for being fixed to a holding-down bracket; and a holding-down bracket including means for being easily attached to and separated from the product bracket.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, preferred embodiments of the present invention will be described in detail with reference to the accompanying drawings.

Figure 2:
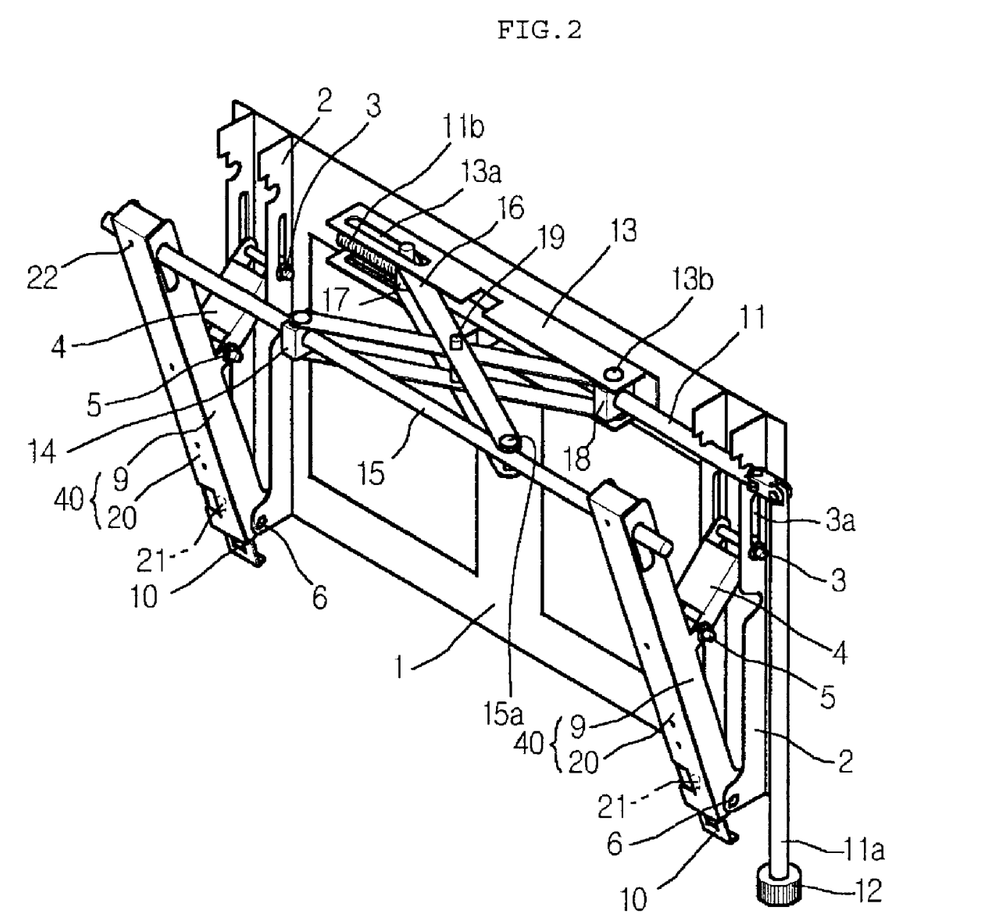
FIG. 2 is a perspective view of an apparatus for adjusting an angle of a display means in accordance with the present invention.

FIG. 2 is a perspective view of an apparatus for adjusting a angle of a display means in accordance with the present invention.

With reference to FIG. 2, the apparatus for adjusting the angle of the display means of the present invention comprises a fixing bracket 1, two guide brackets 2, connection brackets 40, a flap-fixing bracket 13, a flap 16, a balance shaft 15, and an angle adjustable shaft 11. The fixing bracket 1 is fixed to a wall or a supporter. Each guide bracket 2 is installed on both ends of the fixing bracket 1. One end of the connection bracket 40 is pivotably connected to one end of the guide bracket 2, and the other end of the connection bracket 40 is connected to a designated surface of a display means. The flap-fixing bracket 13 is attached to a designated area of the fixing bracket 1. The flap 16 comprises two pieces crossing each other. One end of one piece of the flap 16 is fixed to the flap-fixing bracket 13 and one end of the other piece of the flap 16 is pivotably connected to the flap-fixing bracket 13. Both ends of the balance shaft 15 are connected to each connection bracket 40. The other end of one piece of the flap 16 is fixed to the balance shaft 15, and the other end of the other piece of the flap 16 is connected to the balance shaft 15 50 as to move along the balance shaft 15. The balance shaft 15 serves to adjust the angle of the connection bracket 40 according to the spreading and folding of the flap 16. One end of the flap 16 is connected to the angle adjustable shaft 11. The angle adjustable shaft 11 includes a means for modulating the spreading and folding of the flap 16.

In more detail, the fixing bracket 1 includes a plurality of holes, thereby being fixed to the wall or the supporter using screws, or bolts and nuts.

The guide brackets 2 and the flap-fixing bracket 13 are fixed to the fixing bracket 1.

A hinge hole is formed on one end of the guide bracket 2, thereby coupling the guide bracket 2 with the corresponding connection bracket 40 by a hinge pin 6 inserted into the hinge hole.

A link bracket 4 is connected to the guide bracket 2 by a connection pin 3. The link bracket 4 serves to spread the connection bracket 40 within a designated angle range and to support the connection bracket 40.

A U-groove is formed on both side surfaces of the guide bracket 2, thereby easily folding the connection bracket 40 into the guide bracket 2.

Preferably, a through hole 3a for moving the link bracket 4 according to the modulation of the angle of the connection bracket 40 is formed on both side surfaces of the guide bracket 2.

Further, in order to fix and rotate the angle adjustable shaft 11, a hole or a groove is formed on both side surfaces of the guide bracket 2.

Preferably, the connection bracket 40 comprises a product bracket 20, which is connected to a designated surface of the display means and includes a buckle 21, and a holding-down bracket 9 with a fixing stopper 10. Elasticity of an elastic means is applied to the fixing stopper 10.

Herein, the elastic means may be a spring.

The product bracket 20 comprises a plurality of screw holes 22, which are connected to the display means using screws, and the buckle 21, which is engaged with the fixing stopper 10 of the holding-down bracket 9.

One end of the product bracket 20 is bent, thereby hanging the product bracket 20 on the holding-down bracket 9. The other end of the product bracket 20 is fixed to the fixing stopper 10 of the holding-down bracket 9.

Alternatively, the product bracket 20 and the holding-down bracket 9 may be integrally formed to form the connection bracket 40.

The connection bracket 40 is connected to the corresponding link bracket 4 by a stationary pin 5.

The connection bracket 40 is connected to the balance shaft 15.

The flap-fixing bracket 13 is attached to a designated area of the fixing bracket 1 and comprises a groove for easily folding the flap 16.

A stationary bracket 18 for supporting the angle adjustable shaft 11 is connected to the flap-fixing bracket 13 by an shaft fixing pin 13b.

A sliding hole 13a is formed on both side surfaces of the flap-fixing bracket 13. The sliding hole 13a serves to move the shifting boss 17. The shifting boss 17 moves along a screw thread 11b formed on the outer surface of one end of the angle adjustable shaft 11.

One end of one piece of the flap 16 is connected to the shifting boss 17 and one end of the other piece of the flap 16 is fixed to the flap-fixing bracket 13 by the shaft fixing pin 13b. Two pieces of the flap 16 cross each other on a connection pin 19.

The other end of one piece of the flap 16 is fixed to the balance shaft 15 by an shaft fixing pin 15a, and the other end of the other piece of the flap 16 is connected to a sliding bracket 14 so as to move along the balance shaft 15.

Preferably, two pieces of the flap 16 may be spread and folded centering on a X-shaped crossing point.

The balance shaft 15 is connected to the flap 16 by the shaft fixing pin 15a and the sliding bracket 14. Both ends of the balance shaft 15 are combined with each holding-down bracket 9.

The screw thread 11b is formed on the outer surface of one end of the angle adjustable shaft 11. The other end of the angle adjustable shaft 11 is connected to an angle adjustable extension shaft 11a for easily adjusting the angle of the connection bracket 40.

Preferably, in order to easily rotate the angle adjustable shaft 11, the other end of the angle adjustable shaft 11 is connected to an angle adjustable extension shaft 11a by a universal joint.

Further, preferably, an angle adjustable hand lever 12 for easily rotating the angle adjustable shaft 11 is formed on one end of the angle adjustable extension shaft 11a.

Figure 3:
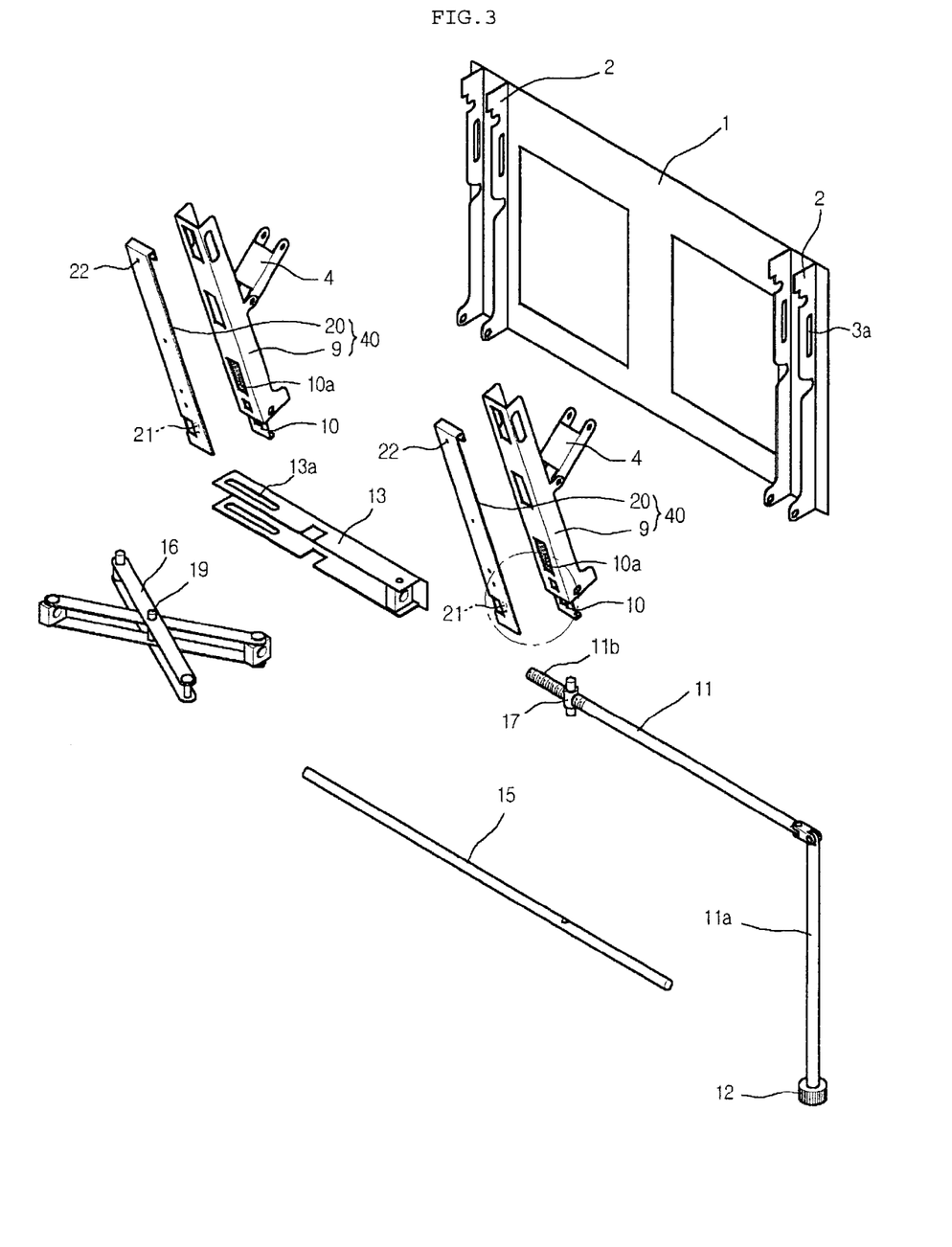
FIG. 3 is an exploded perspective view of the apparatus for adjusting the angle of the display means in accordance with the present invention.

FIG. 3 is an exploded perspective view of the apparatus for adjusting the angle of the display means in accordance with the present invention.

With reference to FIGS. 2 and 3, both ends of the fixing bracket 1 are respectively connected to each of a pair of the guide brackets 2.

The through hole 3a for moving the link bracket 4 and other plural holes are formed on the guide bracket 2. Further, the hinge hole for inserting the hinge pin is formed on one end of the guide bracket 2.

As described above, the connection bracket 40 comprises the product bracket 20 and the holding-down bracket 9.

The holding-down bracket 9 is connected to the link bracket 4 and comprises the fixing stopper 10 and a spring 10a.

In order to be firmly combined with the product bracket 20, a plurality of holes are formed on the holding-down bracket 9.

The product bracket 20 comprises a plurality of the screw holes 22, which are connected to the display means by screws, and the buckle 21, which is engaged with the fixing stopper 10 of the holding-down bracket 9.

The stationary bracket 18 for inserting and fixing the angle adjustable shaft 11 is connected to the flap-fixing bracket 13. The sliding hole 13a is formed on both side surfaces of the flap-fixing bracket 13.

Figure 4:
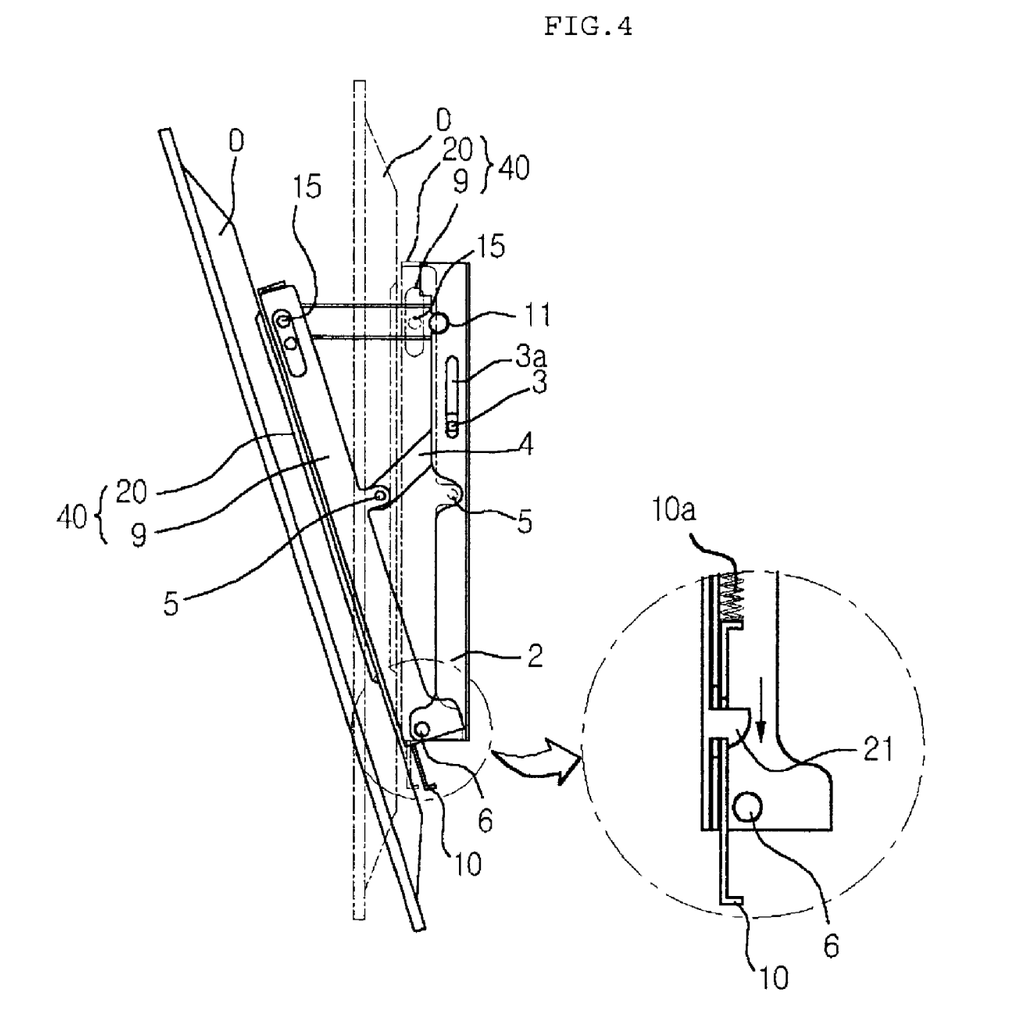
FIG. 4 is a side view of the apparatus for adjusting the angle of the display means in accordance with the present invention.

FIG. 4 is a side view of the apparatus for adjusting the angle of the display means in accordance with the present invention.

With reference FIGS. 2, 3, and 4, the operation of the apparatus for adjusting the angle of the display means in accordance with the present invention is described in detail.

The connection bracket 40 comprises the product bracket 20 and the holding-down bracket 9. The product bracket 20 comprises a means for being connected to the display means and a means for being fixed to the holding-down bracket 9. The holding-down bracket 9 comprises a means for being easily connected to and separated from the product bracket 20.

The above-described connection bracket 40 can be easily connected to and separated from the display means. Therefore, the connection bracket 40 may be used in an apparatus for simply fixing the display means as well as an apparatus for adjusting the angle of the display means.

The product brackets 20 screw-jointed with the display means are coupled to the corresponding holding-down brackets 9, thereby fixing the display means to the connection brackets 40.

The angle adjustable shaft 11 connected to the angle adjustable hand lever 12 by the angle adjustable extension shaft 11a is rotated by turning the angle adjustable hand lever 12 in the clockwise direction.

The shifting boss 17, in which the angle adjustable shaft 11 with the screw thread 11b is inserted, is pulled along the screw thread 11b, and the flap 16 connected to the shifting boss 17 is spread centering on the connection pin 19 of the crossing point.

When the flap 16 is spread, the sliding bracket 14 connected to the flap 16 is pulled, and the holding-down bracket 9 connected to the balance shaft 15 is guided by the link bracket 4 and spread from the guide bracket 2.

Therefore, the display means is caused to lean forward.

After adjusting the angle of the display means, the angle adjustable extension shaft 11a is put aside so as to desirably view the display means.

On the other hand, the angle adjustable shaft 11 connected to the angle adjustable hand lever 12 by the angle adjustable extension shaft 11a is reversibly rotated by turning the angle adjustable hand lever 12 in the counter clockwise direction. Then, the shifting boss 17, in which the angle adjustable shaft 11 with the screw thread 11b is inserted, is pushed along the screw thread 11b, and the flap 16 connected to the shifting boss 17 is folded centering on the connection pin 19 of the crossing point.

When the flap 16 is folded, the sliding bracket 14 connected to the flap 16 is pushed into the shaft fixing pin 15a of the balance shaft 15, and the holding-down bracket 9 connected to the balance shaft 15 is guided by the link bracket 4 and folded into the guide bracket 2.

Therefore, the angle of the display means is reduced and the display means is caused to stand vertically straight.

Figure 5:
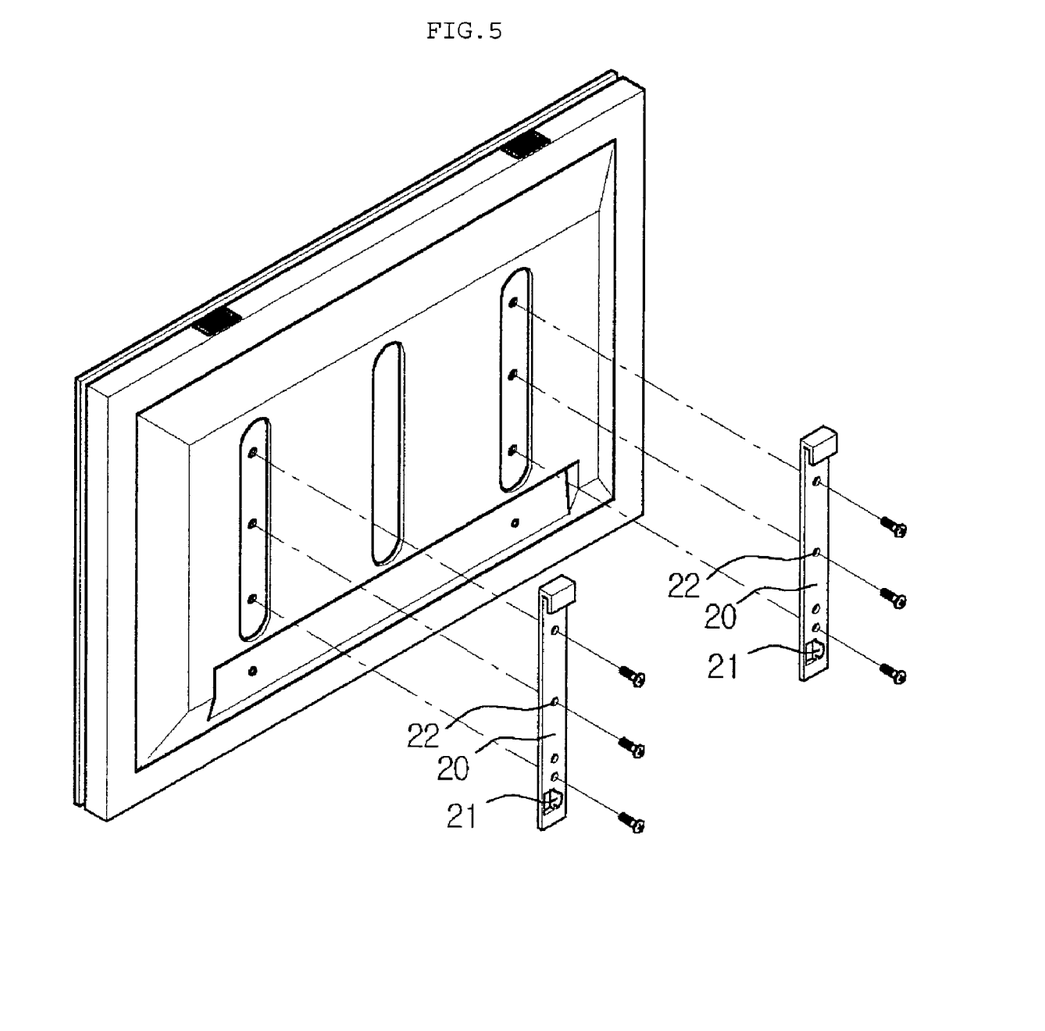
FIG. 5 is a schematic view showing the connection between a display means and connection brackets of the apparatus for adjusting the angle of the display means in accordance with the present invention.

FIG. 5 is a schematic view showing the connection between the display means and the product bracket 20 of the apparatus for adjusting the angle of the display means in accordance with the present invention.

With reference to FIG. 5, holes for screw-jointing are formed on the back surface of the display means.

One end of the product bracket 20 is bent, thereby being firmly coupled with the holding-down bracket 9. The product bracket 20 comprises a plurality of the screw holes 22 for being screw-jointed with the display means.

Further, the product bracket 20 comprises the buckle 21 to enable it to be hung on and fixed to the fixing stopper 10 of the holding-down bracket 9.

As shown in FIG. 5, the connection between the display means and the product bracket 20 is accomplished by connecting screws to the holes of the back surface of the display means and to the screw holes 22 of the product bracket 20.

Figure 6:
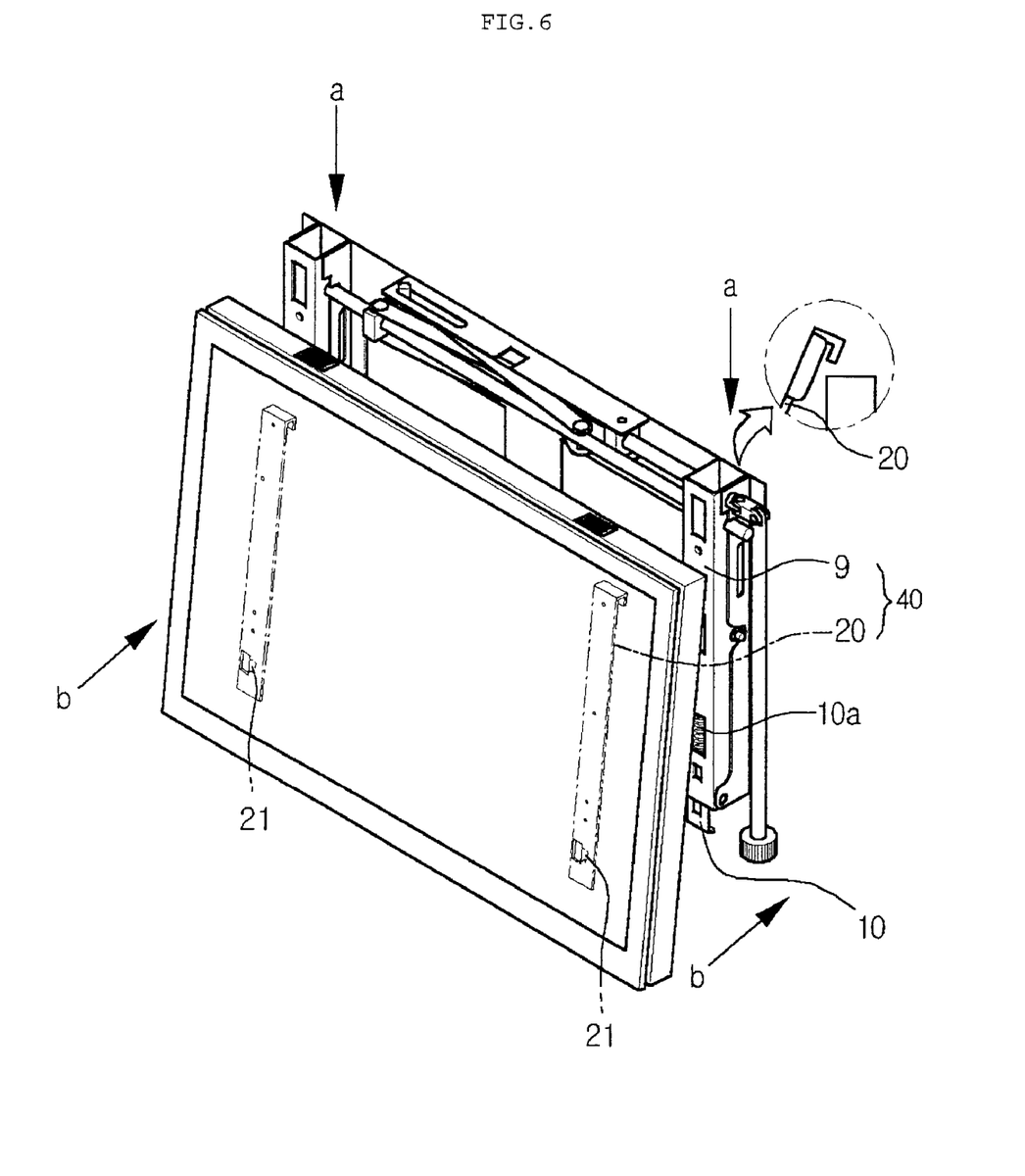
FIG. 6 is a schematic view showing the connection between the connection brackets and the apparatus for adjusting the angle of the display means in accordance with the present invention.

FIG. 6 is a schematic view showing the connection between the connection brackets 40 and the apparatus for adjusting the angle of the display means in accordance with the present invention.

With reference to FIG. 6, the product brackets 20 screw-connected to the display means are coupled with the corresponding holding-down brackets 9.

Herein, the bending portion of the product bracket 20 is inserted into the groove of the holding-down bracket 9 in the direction of a.

Then, when the display means is pushed in the direction of b, the buckle 21 of the product bracket 20 is engaged with the fixing stopper 10 via the hole of the holding-down bracket 9.

Elasticity of the spring 10a is applied to the fixing stopper 10. When the buckle 21 pushes the fixing stopper 10, the spring 10a expands and the fixing stopper 10 moves downward.

When the buckle 21 is entirely inserted into the fixing stopper 10, the fixing stopper 10 is again pulled by the elasticity of the spring 10a.

Thereby, the product bracket 20 is coupled with the holding-down bracket 9.

Figure 7:
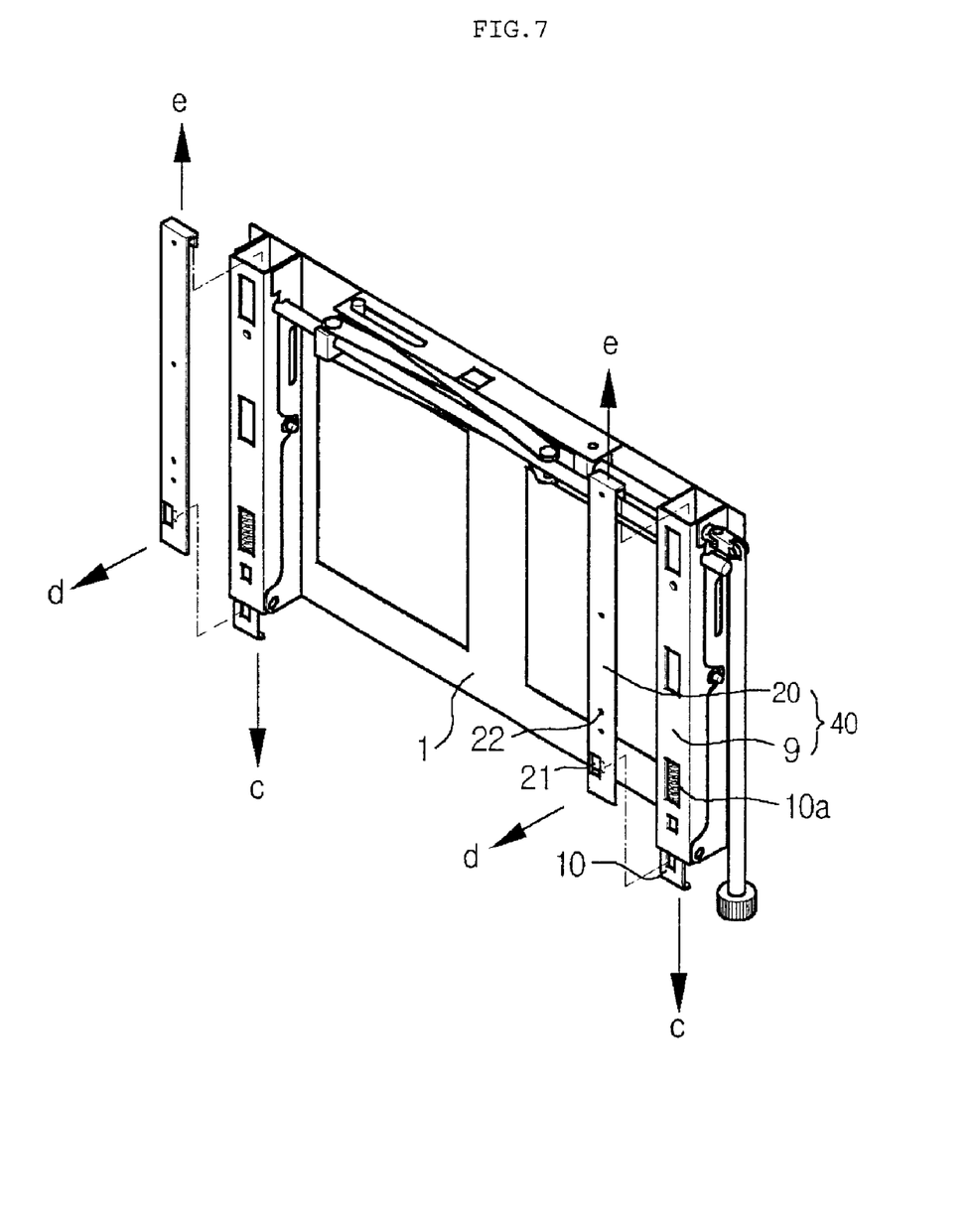
FIG. 7 is a schematic view showing the separation of the display means from the apparatus for adjusting the angle of the display means in accordance with the present invention.

FIG. 7 is a schematic view showing the separation of the display means from the apparatus for adjusting the angle of the display means in accordance with the present invention.

With reference to FIG. 7, when the holding-down bracket 9 pulls the fixing stopper 10 in the direction of c, the spring 10a expands and the buckle 21 is disengaged from the fixing stopper 10.

Then, when the display means (not shown) is pulled in the direction of d, the lower surface of the product bracket 20 is separated from the holding-down bracket 9.

The display means (not shown) is elevated in the direction of e. Then, the bending portion of the product bracket 20 is separated from the holding-down bracket 9, thereby entirely separation the display means from the holding-down bracket 9.

The above-described connection bracket 40 is easily attachable and detachable, thereby being very simply installed on the apparatus for adjusting the angle of the display means.

As apparent from the above description, the present invention provides and apparatus for adjusting a angle of a display means, in which women or old and feeble persons can easily adjust the view angle of the display means by turning the hand lever.

Further, with the apparatus for a adjusting the angle of the display means of the present invention, a desirable view angle of the display means can be finely adjusted.

After adjusting the view angle of the display means, the hand lever can be placed behind of the apparatus, thereby keeping its appearance clean.

A motor and a module for controlling the motor may be used, thereby automatically rotating the angle adjustable shaft without manipulation of the angle adjustable hand lever.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for adjusting a position of a display device, comprising:
    a fixing bracket configured to be fixed to a support structure;
    two guide brackets, wherein one guide bracket is configured to be installed on each end of the fixing bracket;
    a plurality of connection brackets, wherein an end of each connection bracket is configured to be pivotably connected to an end of one of the guide brackets, and wherein a surface of each connection bracket is configured to be connected to a surface of the display means;
    a flap-fixing bracket configured to be attached to the fixing bracket;
    a flap, comprising two flap members configured to cross each other, wherein an end of one flap member is fixed to the flap-fixing bracket, and an end of the other flap member is pivotably connected to the flap-fixing bracket;
    a balance shaft configured to adjust an angle of the connection bracket based on a spreading and a folding of the flap, wherein each end of said balance shaft is configured to be connected to a respective connection bracket, and an end of one flap member is configured to be fixed to the balance shaft and an end of the other flap member is configured to be connected to the balance shaft so as to move along the balance shaft; and
    an angle adjustable shaft configured to be connected to one end of the flap and including an adjustment device configured to adjust the spreading and the folding of the flap.

2. The apparatus of claim 1, further comprising a pair of link brackets, wherein each link bracket is configured to connect a respective guide bracket and connection bracket so as to spread the connection brackets within a designated angle range.

3. The apparatus of claim 1, wherein each of said plurality of connection brackets comprises:
    a product bracket configured to be connected to a surface of the display, wherein the product bracket comprises:
    a buckle; and
    a holding-down bracket, comprising a fixing stopper configured to receive an elastic force from an elastic member.

4. The apparatus of claim 1, wherein the flap is spread and folded centering on a X-shaped crossing point of the two flap members.

5. The apparatus of claim 1, wherein said adjustment device comprises a screw thread formed on the angle adjustable shaft and a shifting boss configured to move along the screw thread based on rotation of the angle adjustable shaft.

6. The apparatus of claim 1, further comprising an angle adjustable extension shaft connected to the angle adjustable shaft and configured to adjust an angle of the plurality of connection brackets.

7. The apparatus of claim 1, further comprising a through hole formed on both side surfaces of each guide bracket and configured to move a respective link bracket based on a modulation of an angle of a respective connection bracket.

8. The apparatus of claim 1, wherein a portion of the flap is configured to be mounted in a corresponding groove formed in the flap-fixing bracket.

9. An apparatus for adjusting an angle of a display, comprising:
    a fixing bracket configured to be fixed to a support structure;
    a pair of guide brackets, wherein one of the pair of guide brackets is configured to be installed at each end of the fixing bracket;
    a pair of connection brackets, wherein one end of each connection bracket is configured to be pivotably connected to one end of a respective guide bracket, and wherein one surface of each connection bracket is configured to be connected to a surface of the display; and
    a pair of link brackets, wherein each link bracket is configured to connect a respective guide bracket and connection bracket, and to separate the connection bracket and the guide bracket so as to fall within a designated angle range.

10. The apparatus of claim 9, further comprising a fraction member attached to a connection portion between a respective link bracket and guide bracket, wherein the fraction member is configured to adjust an angle of the display.

11. An apparatus for adjusting a position of a display device, comprising:
    a fixing assembly, wherein a first surface of the fixing assembly is configured to be fixed to a support structure, and wherein the fixing assembly comprises:
        a fixing bracket having a first surface configured to be fixed to a support structure; and
        two guide brackets configured to be installed, respectively, on each end of a second surface of the fixing bracket;
    a connection assembly wherein a first surface of the connection assembly is configured to be attached to a second surface of the fixing assembly, and a second surface of the connection assembly is configured to be attached to the display device, wherein the connection assembly comprises:
        two product brackets configured to be attached to the display device; and
        two holding-down brackets configured to be removably attached to the product brackets, and to be pivotably attached to the guide brackets at a lower end thereof; and
    an adjustment assembly configured to engage the fixing assembly and the connection assembly, and to adjust a position of a display device mounted on the connection assembly through a sliding and pivoting motion of the connection assembly relative to the fixing assembly.

12. The apparatus of claim 11, wherein each holding-down bracket comprises a stopper configured to fix a buckle of the product bracket in place when engaged so as to easily attach the product bracket and the holding-down bracket, and to release the buckle of the product bracket when the stopper is disengaged so as to easily detach the product bracket from the holding-down bracket.

13. The apparatus of claim 11, wherein the adjustment assembly comprises:
   a flap fixing bracket configured to be attached to an upper portion of the fixing bracket;
   a flap, comprising at least two flap members configured to cross each other, wherein an end of one flap member is fixed to the flap fixing bracket, and an end of another flap member is pivotably connected to the flap fixing bracket; and
   a balance shaft attached to the flap and one or more of the holding-down brackets, and configured to adjust an angle of the connection assembly based on a spreading and a folding of the flap.

14. The apparatus of claim 13, wherein each end of the balance shaft is configured to be connected to a respective holding-down bracket, and wherein an end of one flap member is configured to be fixed to the balance shaft while an end of the other flap member is configured to be connected to the balance shaft so as to move along the balance shaft.

15. The apparatus of claim 13, further comprising an angle adjustment shaft configured to be connected to one end of the flap and including an adjustment device configured to adjust the spreading and the folding of the flap.

16. The apparatus of claim 15, further comprising an angle adjustment extension shaft connected to the angle adjustment shaft and configured to adjust an angle of the connection brackets.

17. The apparatus of claim 15, wherein the adjustment device comprises a screw thread formed on the angle adjustment shaft and a shifting boss configured to move along the screw thread based on rotation of the angle adjustment shaft.

18. The apparatus of claim 12, further comprising a pair of link brackets, wherein each link bracket is configured to connect a respective guide bracket and connection bracket so as to spread the connection brackets within a designated angle range.

19. A connection bracket for connecting a display device to a display mounting device, comprising:
   a product bracket configured to be connected to a rear surface of a display device;
   a holding down bracket configured to receive a bent portion of the product bracket so as to releasably couple the product bracket to the display mounting device; and
   an adjustment apparatus configured to adjust a position of the display device mounted on the display mounting device, comprising:
   a fixing assembly, wherein a first surface of the fixing assembly is configured to be fixed to a support structure;
   a connection assembly, wherein a first surface of the connection assembly is configured to be attached to a second surface of the fixing assembly, and a second surface of the connection assembly is configured to be attached to the display device; and
   an adjustment assembly configured to engage the fixing assembly and the connection assembly, and to adjust a position of a display device mounted on the connection assembly through a sliding and pivoting motion of the connection assembly relative to the fixing assembly.

20. The connection bracket of claim 19, wherein the product bracket comprises a buckle configured to engage the holding down bracket, and wherein the holding down bracket comprises a fixing stopper configured to fix the buckle of the product bracket in place when the fixing stopper is engaged.

21. The connection bracket of claim 20, wherein said fixing stopper is configured to fix the buckle of the product bracket by an elastic force provided by an elastic member.

* * * * *